United States Patent [19]

Lankin

[11] Patent Number: 5,332,954
[45] Date of Patent: Jul. 26, 1994

[54] OPTIMAL DC MOTOR/CONTROLLER CONFIGURATION

[75] Inventor: Robert Lankin, Waterloo, Canada

[73] Assignee: Solaria Research Enterprises Ltd., Canada

[21] Appl. No.: 859,590

[22] Filed: Mar. 30, 1992

[51] Int. Cl.$^5$ .............................................. H02P 1/00
[52] U.S. Cl. .................................... 318/139; 318/527; 318/300; 318/381; 318/251
[58] Field of Search .................. 290/35; 318/521–530, 318/246, 251, 139, 138, 296–300, 818–821, 829, 362, 364, 368, 372–373, 375–381, 759, 291–293

[56] References Cited

U.S. PATENT DOCUMENTS

| | | | |
|---|---|---|---|
| 3,845,368 | 10/1974 | Elco | 318/139 |
| 4,012,680 | 3/1977 | Dickerson et al. | 318/79 |
| 4,247,807 | 1/1981 | Wilson | 318/493 |
| 4,300,080 | 11/1981 | Lee | 318/563 |
| 4,386,299 | 5/1983 | Pham | 318/261 |
| 4,558,265 | 12/1985 | Hayashida et al. | 318/561 |
| 4,626,750 | 12/1986 | Post | 318/139 |
| 4,730,151 | 3/1988 | Florey et al. | 318/139 |
| 4,967,132 | 10/1990 | Rozman et al. | 318/798 |
| 4,988,931 | 1/1991 | Tsukahara et al. | 318/293 |
| 5,032,774 | 7/1991 | Juzswik | 318/293 |
| 5,032,780 | 7/1991 | Hopkins | 318/696 X |
| 5,039,924 | 8/1991 | Avitan | 318/139 |
| 5,070,283 | 12/1991 | Avitan | 318/493 X |
| 5,132,600 | 7/1992 | Kinoshita | 318/280 X |

FOREIGN PATENT DOCUMENTS 91302203.4 11/1991 European Pat. Off. .

OTHER PUBLICATIONS

Article entitled "Microprocessor-Based High-Efficiency Drive of a DC Motor," IEEE Transactions on Industrial Electronics, vol. IE-34, No. 4, Nov. 1987, pp. 433-440.

Primary Examiner—William M. Shoop, Jr.
Assistant Examiner—David Martin
Attorney, Agent, or Firm—Varnum, Riddering, Schmidt & Howlett

[57] ABSTRACT

Optimal constructions for two motor/controller configurations are disclosed. The controller structure includes an H-bridge for controlling field current using synchronous-rectification of MOSFET devices, and a circuit for chopping the armature current using synchronous-rectification of MOSFET devices arranged in a half bridge. The controller may be configured with a series-wound or a separately excited DC traction motor. In the series-wound motor/controller configuration, the field and the armature current are separately controlled. In the separately excited motor/controller configuration, the field of the motor is preferably wound so that the rated field current is achieved at about 20% of the rated battery voltage. This provides a separately excited motor in which the field current can be boosted by a factor of 5 to achieve high start-up and low speed torques which match the torque outputs of a series-wound motor under similar operating conditions.

18 Claims, 4 Drawing Sheets

OPTIMAL DC MOTOR/CONTROLLER CONFIGURATION

The present invention relates to solid-state electronic controls for direct current traction motors, and more particularly to controls for direct current traction motors used in electrically powered vehicle applications. The present invention further relates to optimal direct current motor/controller configurations designed to provide efficient electric power drives.

RELATED APPLICATION

The present application is related to U.S. Patent application Ser. No. 07/859,266, filed concurrently herewith for a "Synchronous-Rectification Type Control for Direct Current Motors And Method of Making".

BACKGROUND OF THE INVENTION

Electrically driven vehicles such as forklifts and the like require drive systems which are capable of delivering high start-up and low speed torques for accelerating the vehicle, propelling loads up grades, creeping under load, etc. Series-wound DC motors are capable of generaling very high start-up and low speed torques. For this reason, the traditional drive motor of choice for most electrically powered vehicles has been the series-wound DC motor. Nonetheless, series-wound DC motors have a number of recognized characteristics which are not advantageous. For instance, the speed of a serious-wound DC motor will vary significantly with a load. In addition, reversing, braking and field weakening a Series motor requires robust contactors which are capable of handling full armature current. Such contactors are expensive to install and maintain.

An alternative to the series-wound DC motor is the separately excited DC motor. Separately excited motors do not suffer from the disadvantages of the series-wound DC motor but they do not provide the advantage of high start-up and low speed torques which the series-wound motor is capable of generating.

It has been suggested that series-wound motors be operated in a separately excited fashion in which the field and armature currents are independently controlled. Hong and Park in an article entitled "Microprocessor-Based High-Efficiency Drive Of A DC Motor" *IEEE Transactions on Industrial Electronics*, Vol. IE-34, No. 4, November, 1987, discuss the operation of series and separately excited electric motors using a microprocessor based control algorithm wherein a table look up for an optimum field current to armature current ratio is based on a function of motor rotational speed. In a DC machine, there are many combinations of field and armature current which will provide a desired motor speed and torque. One combination of field and armature current will produce the desired motor speed and torque most efficiently. It has been proposed that a constant ratio "k" of field to armature current can be used to determine the optimum field and armature currents. Hong and Park demonstrate that "k" should vary as a function of motor rotational speed, but should not be related to load. In accordance with their teachings therefore an optimal controller will derive "k" as a function of motor speed.

U.S. Pat. No. 5,039,924 which issued Aug. 13, 1991 to Avitan teaches a system for optimizing control of separately excited DC motors whereby optimization is achieved through microprocessor-based independent PWM control of a chopper (armature) and an H-bridge (field). The disadvantage of this system is that separately excited motors require much higher armature currents when operating above rated torques, which is necessary for achieving the peak torques required for most electrically powered vehicle applications. High armature currents result in commutator and brush wear because power loss follows the ratio $T^2R$, so that when current doubles, resistive losses quadruple which leads to premature and excessive wear on the commutator and brushes of the separately excited motor.

U.S. Pat. No. 4,730,151 which issued Mar. 8, 1988 to Florey et al. describes a method for operating an electronic control system for an operator controlled, electrically driven vehicle wherein the motor is operated in one of a series and a separately excited mode. The series mode of operation is selected for providing high start-up torques while the separately excited mode of operation is selected for providing efficient high speed operation. The disadvantages of this control system include an energy inefficient SCR chopper circuit, inefficient contactors for switching from one mode to another and no capability for regeneratively braking at low motor rotational speeds.

Traditional prior art controllers commonly use a braking technique known as "plug braking" in which the momentum of an electrically powered vehicle is braked by reversing the direction of the field current with respect to the motoring direction (direction of rotation of the armature). "Plug braking diodes" connected in parallel with the armature of a motor connected to such controllers provide a short circuit for the armature output when the field current is reversed. Because the plug braking diode is forward biased during plug braking, the controller is chopping directly from the battery into the motor field, resulting in momentarily large field currents which yield a very strong braking response. Although plug braking is very effective in overcoming momentum, it actually wastes battery current. Regenerative braking, on the other hand, replaces a part of the battery current used in building momentum. It therefore is desirable to use regenerative braking whenever possible.

A disadvantage of prior art regenerative braking techniques, such as taught in U.S. Pat. No. 4,730,151, is that they do not teach a method for providing effective regenerative braking at low motor rotational speeds. They are therefore incapable of effectively regeneratively braking momentum of an electrically powered vehicle once the speed of a vehicle has dropped below a certain limit.

SUMMARY OF THE INVENTION

It an object of the invention to provide an electronic controller for a series-wound or a separately excited traction motors which uses only MOSFET devices for switching both the field and armature currents of the motor.

It is another object of the invention to provide an electronic controller for DC traction motors which eliminates all requirement for contactors for controlling either of a series-wound or a separately excited direct current traction motor.

It is a further object of the invention to provide an electronic controller for use with either a series-wound or a separately excited traction motor which provides effective regenerative braking even at low motor rotational speeds.

It is another object of the present invention to provide a controller capable of directly controlling field current of a series-wound direct current traction motor without substantial current losses.

It is yet another object of the invention to provide a controller for DC traction motors which provides continuous "field weakening" for achieving over speeding of a series-wound or a separately excited motor.

It is a further object of the invention to provide an optimal configuration for a series-wound mototr/controller wherein the motor field is independently controlled by an H bridge which includes only MOSFET devices switched using a synchronous-rectification technique.

It is yet a further object of the invention to provide an optimal configuration for a separately excited motor/controller combination which provides a continuous "field boost" mechanism for obtaining momentarily high torques while maintaining commutation limits to reduce commutator heating and premature wear.

Thus in accordance with the invention there is provided an electronic control for direct current traction motor, comprising an H-bridge circuit for controlling a field current of the motor, the H-bridge circuit including four legs arranged in opposite pairs of an upper leg and a lower leg in each pair, each leg including only a plurality of parallel-connected power field effect transistors arranged for connection in series with the field, a field gate electrode of the power field effect transistors in each said plurality being connected to a discrete common control line for switching each said plurality of field effect transistors in an on/off cycle of conduction through each plurality of field effect transistors.

The controller in accordance with the invention thus includes a "full-bridge" or "II-bridge" circuit for controlling a field current of a motor and a "half-bridge" circuit for controlling armature current. Armature current and field current are controlled independently without contactors. The half-bridge for controlling armature current consists of a first plurality of parallel-connected power field effect transistors connected in series with the armature of the motor and a second plurality of parallel-connected power field effect transistors connected in parallel with the armature of the motor. This arrangement of devices is switched in accordance with a synchronous-rectification technique described in a co-pending patent application referred to above in the section entitled "Related Applications", which co-pending patent application is hereby incorporated by reference.

While it is desirable to support existing series-wound motors with a controller which provides independent field current control in order to realize certain advantages achievable through independent field control, the series-wound field is not particularly adapted to control from an H-bridge. H-bridges may be switched using a variety of switching configurations. The switch configuration in accordance with the invention includes only metal-oxide-semiconductor field effect transistors (MOSFETs) in each leg of the bridge. A pulse width modulated (PWM) gate signal is preferably applied to the lower legs of the H-bridge, and synchronous-rectification gate signals applied to the upper legs. For smaller horse power series-wound motors, it has become cost effective to use an H-bridge to control the motor field, thereby eliminating relays and contactors. Although the currents required to energize the field of a series-wound motor are substantial, with the current multiplication which may be achieved in a series field winding using proper switching sequences the number of MOSFETs required for switching current through a series field is not as great as would be assumed. For instance, a typical 2 Hp 36 V series motor requires a continuous current rating of about 64 Amps, and peak ratings of up to 320 Amps. To switch these currents, about 16 typical MOSFET devices (IRFZ44 type) are required to switch the armature current. The M-bridge, however, does not require four times that number of devices. Because of the substantial current multiplication into an appropriately switched series field, the lower H-bridge legs may be operated at a very low duty cycle and therefore do not have high conduction losses. Also, in the controller in accordance with the invention one upper leg of the H-bridge is switched only when the direction of rotation of the motor is changed while the opposite upper leg is switched in a synchronous-rectification sequence. Therefore, the total MOSFET count in the H-bridge is only about double the count for the armature bank rather than quadrupled, as might be expected.

There is therefore provided in accordance with another aspect of the invention an optimal series-wound motor/controller configuration wherein an H-bridge controls the field current and a half-bridge controls the armature current, and each bridge is independently switched using synchronous-rectification techniques to minimize energy losses and waste heat generation.

For reasons of economy only, when a motor larger than 5 HP is required, it is desirable to use a separately excited motor because separately excited motors require much less switching capacity for the field current. While a separately excited motor requires fewer switching devices for field control, traditional separately excited motors wear prematurely under high peak torque requirements.

The peak current which a motor can safely commute is limited by the commutator design. In practical electrically power vehicle designs, the multiplier between "rated current" and "peak current" is usually limited by both battery power capacity and safe motor operating limits to a factor of approximately five.

There is therefore provided, in accordance with a further aspect of the invention, an optimal DC motor/controller configuration which is obtained using a separately excited motor that is wound for a rated field current at 20% of the peak battery voltage. When peak torques above the motor rating are required, the PMW controlling H-bridge switching is increased accordingly up to a maximum of 100% resulting in five times the rated field current and thereby generating a torque equivalent to a series-wound motor at five times rated current. This motor design permits the use of an H-bridge which is economically constructed because the number of current switching devices in the H-bridge is minimized.

In accordance with yet a further aspect of the invention there is provided a mode of operating a motor/controller combination whereby motor braking is essentially exclusively a regenerative braking process. Regenerative braking is achieved by leaving the field energized in the same direction in which the armature is rotating regardless of a travel direction selected by an operator. If an operator selects braking by reversing a direction selector switch from the direction of travel, the controller automatically switches to a regenerative braking mode by overriding the direction selector switch to maintain field direction (armature rotating forward, forward field is applied). A PWM signal is applied to synchronous-rectification MOSFETs connected in parallel with the armature of the motor and those FETs act as regenerative braking switches. When the synchronous-rectification (SR) FETs are closed, the armature is momentarily shorted resulting in a rapid increase in armature current. When the SR FETs are opened, the armature fly back voltage ($V = -Ldi/dt$) adds to the motor back emf to produce a total armature voltage which is one diode drop higher than the battery voltage. During the open condition of the SR FETs, the generated current commutes back to the battery through motor chopper MOSFETs which are closed in a synchronous-rectification cycle co-ordinated with the SR FETs, thereby recharging the battery.

By controlling the PWM to the synchronous-rectification FETs and boosting field strength by controlling a PWM to the H-bridge, it is possible to attain a strong regenerative braking response down a point where the motor is at full stop.

BRIEF DESCRIPTION OF THE DRAWINGS

The invention will now be described by way of example only and with reference to the following drawings, wherein.

DETAILED DESCRIPTION OF THE PREFERRED EMBODIMENTS

Figure 1:
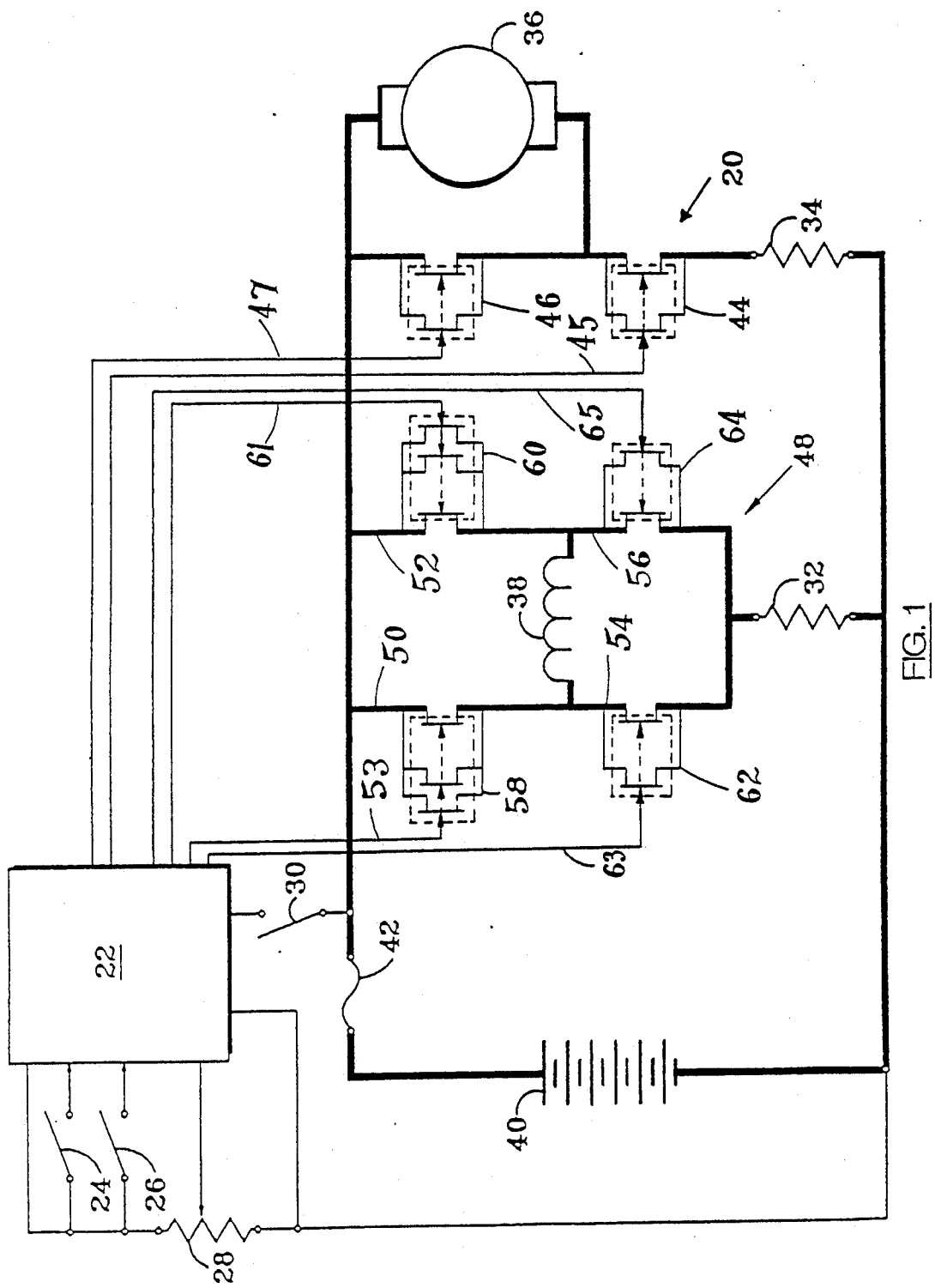
FIG. 1 is a schematic diagram of the topology of an optimal configuration for a DC motor/controller in accordance with the invention.

FIG. 1 shows an optimal configuration for a DC motor/controller in accordance with the invention generally referred to by reference 20. The optimal motor/controller configuration 20 includes a control logic circuit 22 which receives inputs from a forward direction switch 24, a reverse direction switch 26 and an accelerator potentiometer 28. The control logic circuit 22 further receives input from a key enable switch 30 which is used to disable operation of the system. The control logic circuit 22 likewise pollo a field current sensor 32 and a armature current sensor 34 as will be discussed hereinafter in more detail. The motor/controller configuration 20 controls the operation of a direct current traction motor which includes an armature 36 and a field winding 38. The armature 36 and the field winding 38 may be that of either a series-wound or a separately excited direct current traction motor. The armature 36 and field 38 are energized with electrical power supplied by a battery 40 and protected by a fuse 42 that is designed to protect the system from damage due to a fault condition.

Current flow to the armature is controlled by a plurality of parallel-connected power MOSFET devices, hereinafter referred to as Motor FETs 44. Voltage generated by armature 36 when Motor FETs 44 are switched off is commuted by a plurality of parallel-connected MOSFET devices connected in parallel with the armature, hereinafter referred to a SR FETs 46. Current flowing to the field 38 is controlled by an H-bridge circuit generally referred to by reference 48. The H-bridge circuit 48 includes a pair of opposed upper legs, 50 and 52 respectively. The H-bridge also includes a pair of opposed lower legs 54 and 56 respectively. Each leg of the H-bridge circuit includes a plurality of parallel-connected MOSFET devices collectively referred to as H-bridge FETs and indicated by references 58, 60, 62 and 64. Each plurality of MOSFET devices is switched by a common discrete control line that is connected in series to their respective gate electrodes. Each discrete control line is independently driven by the control logic circuit 22. Motor FETs 44 are switched by a control line 45. SR FETs 46 are switched by a control line 47 and H-bridge FETs 58, 60, 62 and 64 are respectively switched by control lines 59, 61, 63 and 65.

As is apparent from FIG. 1, the motor/controller configuration in accordance with the invention does not include any contactors. All current switching is handled directly by the controller using only MOSFET devices, thereby eliminating the cost of providing and maintaining contactor switches.

Figure 2:
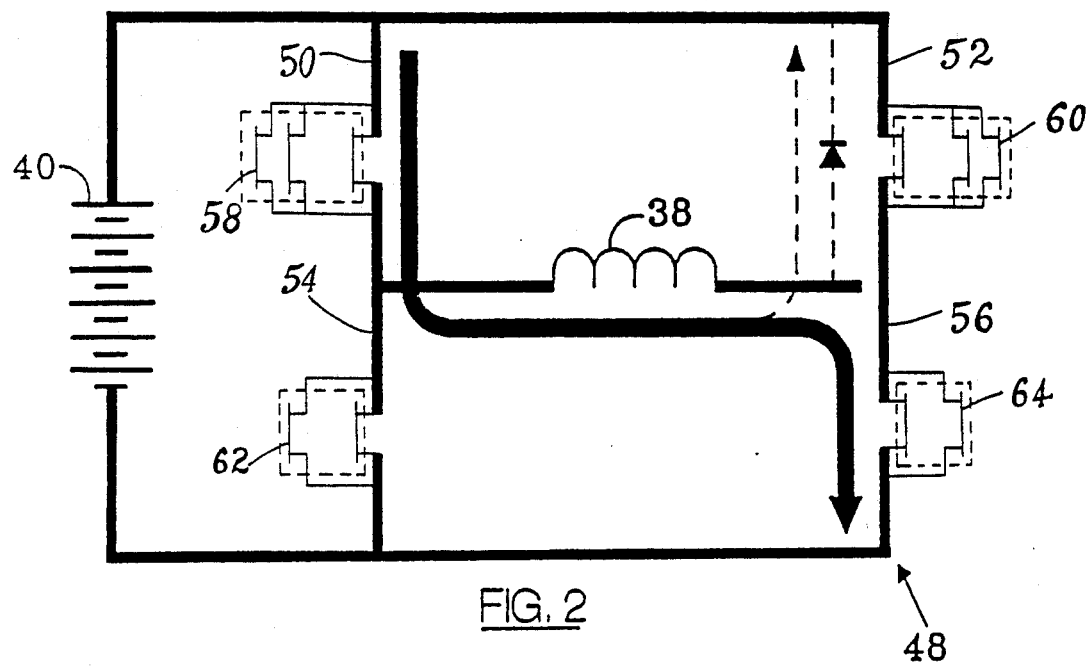
FIG. 2 is a schematic diagram of an H-bridge in accordance with the invention operating in a forward direction.

FIG. 2 shows a schematic diagram or the current flow through the H-bridge circuit 48 when the motor is energized in a forward direction. Under these conditions, the H-bridge FETs 58 in the upper left leg 50 of the H-bridge 48 are switched on by control logic circuit 22 which drives the control line 59 high while the H-bridge FETs 62 in the lower left leg are switched off by the control logic circuit 22 which drives the control line 63 low. The H bridge FETs 64 in the lower right leg 56 are switched by a PWM signal having a duty cycle which is set by an algorithm that senses armature current using armature current sensor 34 and adjusts the PWM duty cycle so that an equivalent current is delivered to the field if the motor is a series-wound motor. Alternatively, the algorithm can set $I_f/I_a$ in an optimal ratio as described by Hong and Park. Field current can be commuted through integral body diodes of H-bridge FETS 60 (illustrated in phantom lines adjacent the H-bridge FETs 60) during periods when the H-bridge FETs 64 are switched off. Preferably, a PWM synchronous-rectification duty cycle is used to switch on H-bridge FETs 60 in the top left leg 52 of the H-bridge during periods that the H-bridge FETs 64 are switched off. The field current is thus commuted and transient voltage spikes are minimized. The switching of the PWM duty cycles to H-bridge FETs 60 and 64 are co-ordinated by the control logic circuit 22 so that H-bridge FETs 60 are not switched on until a few tens of nanoseconds after the switch device time of H-bridge FETs 64 has elapsed. This prevents shorts in the H-bridge which could arise if the H-bridge FETs 60 and 64 were simultaneously conductive.

The synchronous-rectification switching of the H-bridge described above is particularly important when a series-wound motor is controlled. Since the field of a series-wound motor is not particularly well adapted to control from an H-bridge circuit, it is necessary to use a switching sequence which takes advantage of the current multiplication that can be achieved in a series-wound field. By adopting the switching sequence described above, an optimal configuration is achieved which requires very low duty cycles for the H-bridge FETs 64 that control the field current. This economizes the number of FETs required in the lower legs 54, 56 of the H-bridge but As a general rule, the lower legs 54, 56 require about four times fewer FETs than the upper legs 50, 52. Economizing the number of FETs in lower legs 54, 56, however, makes synchronous-rectification switching of the FETs 60 essential for an energy efficient operation of the motor/controller system. For example, a 2 HP series-wound motor under certain load conditions may require a 5% duty cycle applied to H-bridge FETs 64 to regulate the field current. If the integral body diodes of H-bridge FETs 60 are used to commute the field current when H-bridge FETs 64 are switched off, the diode losses, assuming an average field current of 100 Amps and an average voltage drop across the diodes of 0.7 V, is approximately:

$$V_{out} = PWM * V_{bat} = 0.05 * 36V = 1.8V$$

$$P_{out} = 100 A * 1.8 V = 180 \text{ Watts};$$

and Diode losses = 100 A * 0.7 V * 0.95 = 66.5 Watts; so the loss in % is $$\frac{66.5 \text{ WATTS}}{180 \text{ WATTS}} = 36.9\%$$

The losses using synchronous-rectification switching of the H-bridge FETs 60, however, are significantly lower, about 50% lower, since the conduction losses in synchronously-rectified H-bridge FETs 60 do not include a 0.7 V diode junction drop. Use of a MOSFET H-bridge architecture switched in accordance with the optimal configuration described above therefore permits an energy efficient independent control of a series-wound field.

Figure 3:
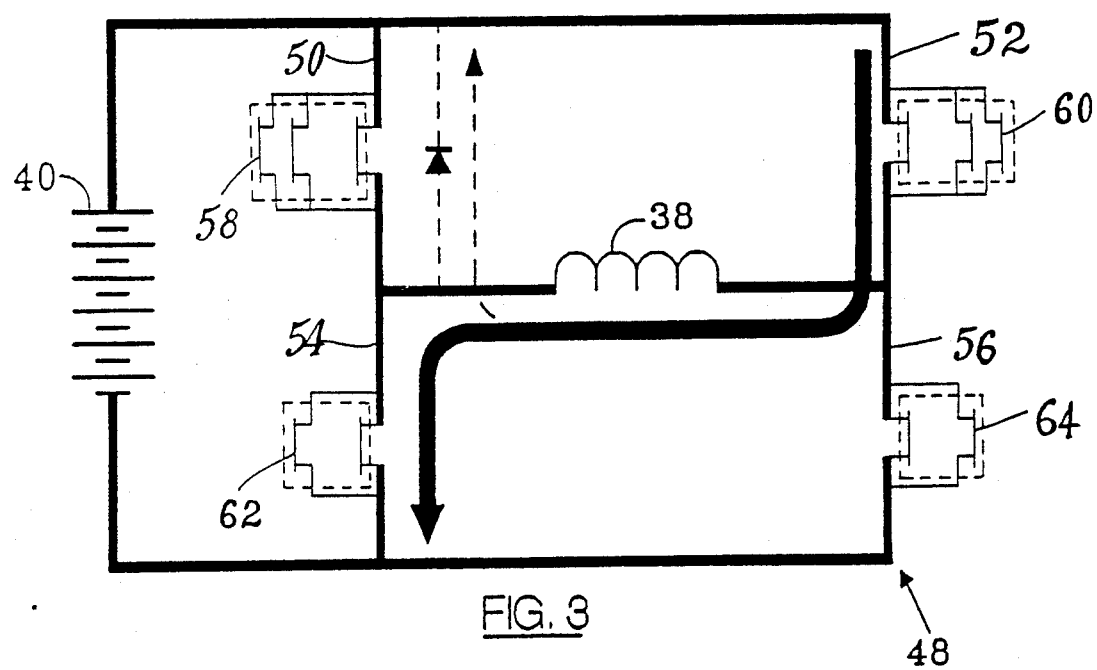
FIG. 3 is a schematic diagram of an H-bridge in accordance with the invention operating in a reverse direction.

FIG. 3 shows a schematic diagram of the current flow through the field when the motor is operated in a reverse direction. In this case, H-bridge FETs 60 in the upper right leg 52 of the H-bridge are switched on and H-bridge FETs 61 in the lower right leg 54 of the H-bridge are switched off. Likewise, H-bridge FETs 62 in the lower right leg 56 of the H-bridge are switched in an on/off cycle controlled by a PWM duty cycle driven by an algorithm which operates as described above. The H-bridge FETs 58 in the upper left leg of the H-bridge are likewise switched in an on/off synchronous-rectification cycle to commute field current when the H-bridge FETs 62 are switched off.

In order to reduce the number of MOSFET devices required in the H-bridge of controller for larger motors, it is desirable to use a separately excited motor. For example, a separately excited 10 HP, 36 V motor may require a field current of only about 14 amps so that an H-bridge for the motor requires only 4 MOSFET device. A traditionally wound separately excited motor, however, has a disadvantage in that the field current is limited to the rated value. Thus, traditionally wound separately excited motors require much higher armature currents when operating above rated torques for providing start-up and low speed torques that are equivalent to those achievable with series-wound motors. As noted above, higher armature currents result in premature commutator and brush wear. Therefore while separately excited motors require few switching devices, in the H-bridge of the controller, the separately excited motor wears prematurely under high torque demands.

The peak current which a motor can safely commute is limited by the commutator design. In practical electronic vehicle designs, the multiple between the "rated" current and the "peak" current is often limited by both battery power capacity and safe motor operating limits to a factor of approximately 5. An optional DC motor in accordance with the invention is obtained by a separately excited motor which is wound for a field rated current at 20% of the battery voltage. This is achieved by winding the motor field with fewer windings of a heavier gauge, as will be understood by those skilled in the art. Therefore the control algorithm that sets the PWM which drives the H-bridge duty cycle operates at about 20% under normal operating conditions. when peak torques above the motor rating are required the H-bridge PWM is increased accordingly up to a maximum of 100% resulting in five times the rated field current, thereby generating momentary peak torques equivalent to the series motor at 5 times rated current.

Another advantage of the motor/controller configurations described above is that field weakening may be achieved for over speeding the motor without the use of a field weakening contactor/resistor set which has been traditionally used for this application. control logic circuit 22 (see FIG. 1) regularly polls motor speed using a tachometer (not illustrated) or a motor speed computation algorithm well known in the art, and armature current using the armature current sensor 34. If the armature current of a motor drops below a previously defined level while motor speed is above a previously defined RPM, the control logic circuit 22 cuts back the PWM controlling the H-bridge field current FETs, 62 or 64 depending on the direction of travel, so that the field is weakened in accordance with an algorithm which is well known in the art, thus permitting over speeding of the motor by direct control of the field current.

A further advantage of the motor/controller configurations described above is that an electrically powered vehicle driven by either of the optimal motor/controller configurations behaves much like a vehicle driven by an internal combustion engine. This behavior is achieved by a regenerative braking system which is active whenever the position of the throttle potentiometer 28 indicates a condition of deceleration. Traditionally, regenerative braking systems have produced "weak" braking effects. The optimal motor/controller configurations in accordance with the invention provide a "strong" regenerative braking effect because the field strength can be "boosted" during regenerative braking to enhance the braking effect.

The control logic circuit 22 (see FIG. 1) includes a programable microprocessor (not illustrated) which accepts a variable that sets a minimum regenerative braking field strength. The minimum regenerative braking field strength variable determines the strength of a regenerative braking response. Regenerative braking is achieved by keeping the field 38 (see FIG. 1) energized in the same direction in which the armature 36 is rotating (armature rotating forward, apply forward field). During braking a PWM is applied to the SR FETs 46 which act as braking FETs under deceleration conditions. During deceleration when SR FETs 46 are closed, the armature 36 is momentarily shorted, resulting in rapid current generation. When the SR FETs 46 are opened, the generated current commutes back to the battery 40 through the motor FETs 44 which are closed in a synchronous rectification cycle that is co-ordinated with the opening of SR FETs 46 by control logic circuit 22, thereby recharging the battery 40. During regenerative braking, the armature fly back voltage (V = −Ldi/dt) adds to the motor back emf to produce a total armature voltage which is one diode drop greater than the battery. It can be demonstrated that converse current multiplication math works for regenerative braking:

$$I_{motor-regen} = I_{battery-regen}/PMW_{regen}$$

$$V_{armature} = V_{battery} * PMW_{regen}$$

$$I_{motor-regen} = (V_{armature} - K * speed)/K_{armature}$$

This math assumes a constant (rated) field 38 and 100% efficiency. Using the optimal series-wound motor configuration, or the optimal separately excited motor configuration in accordance with the invention, the strength of field 38 can be increased above the rated strength so that strong regenerative braking is achievable.

Figure 4A:
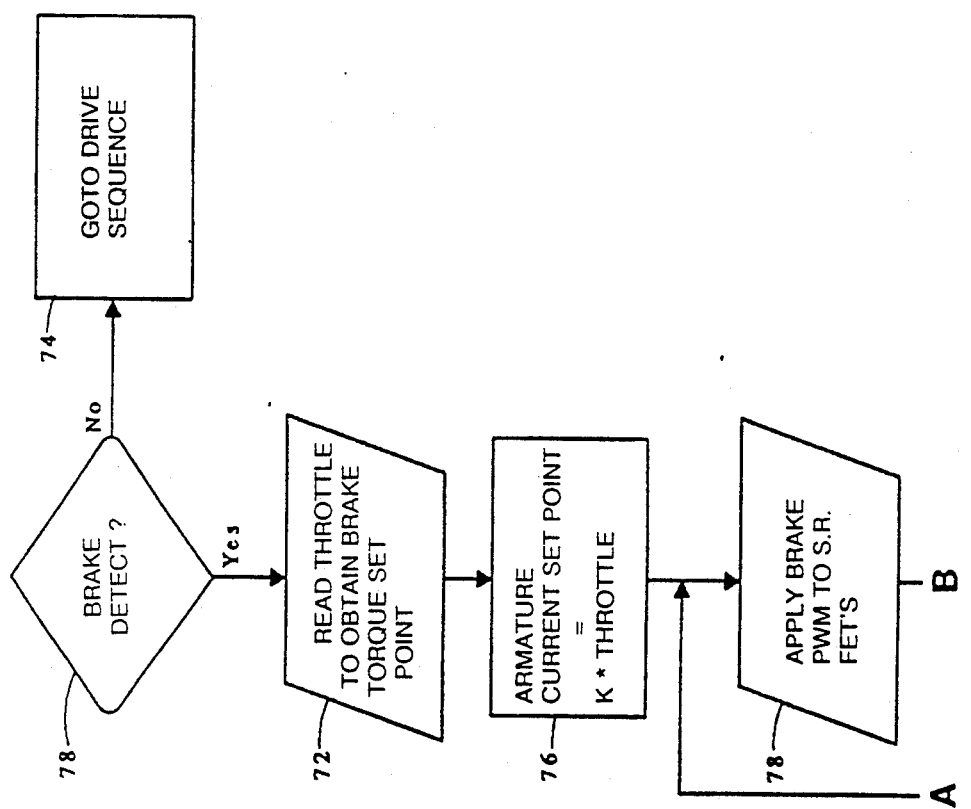
FIG. 4(a) and (b) are flow diagrams showing the regenerative braking process which is executed when an operator of a vehicle driven by the motor/controller shown in FIG. 1 selects a braking option whereby a direction of travel selector is reversed from the actual direction of travel while the vehicle is in motion.
Figure 4B:
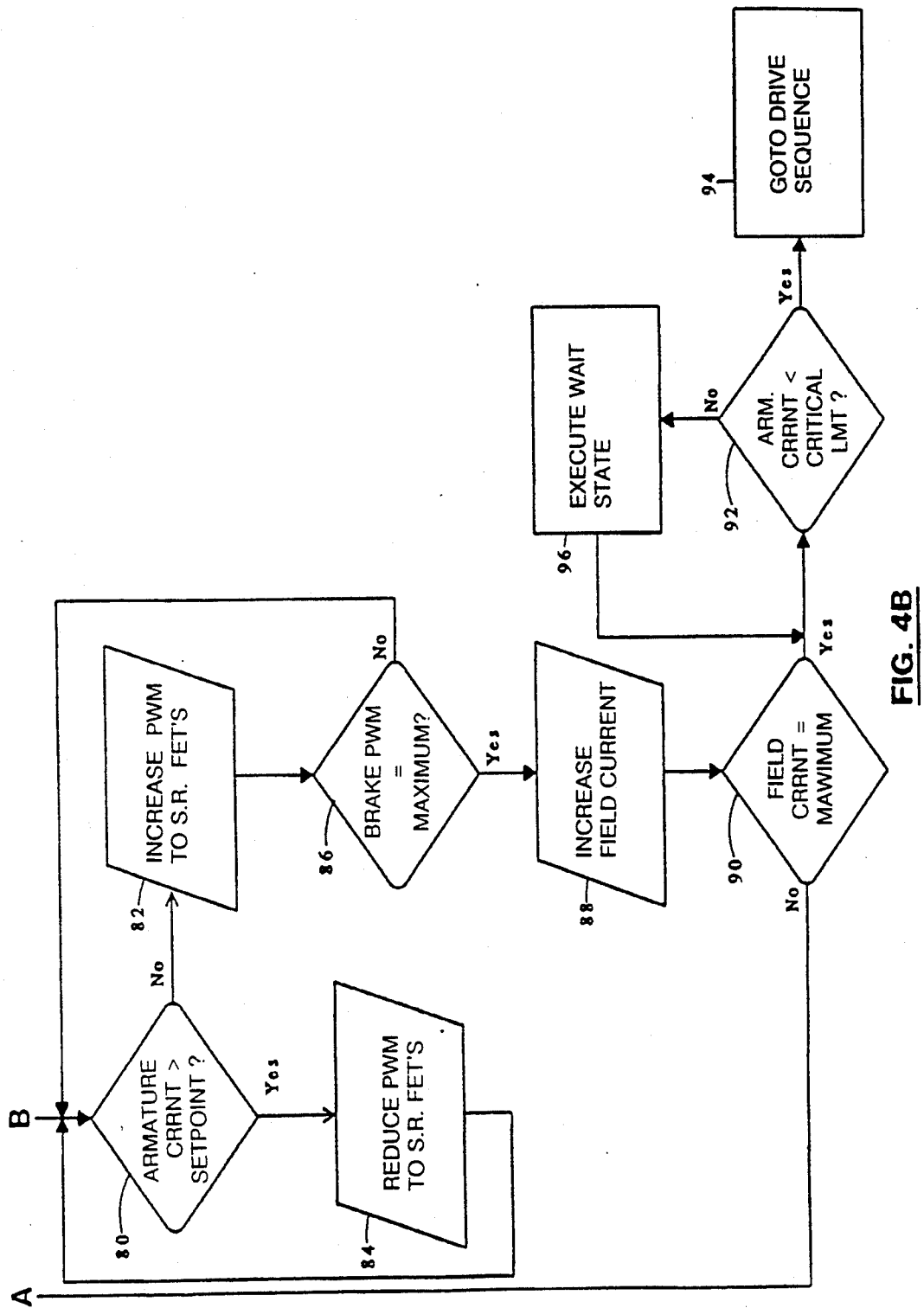

During vehicle operation, control logic circuit 22 regularly polls a brake sensor 68 (see FIG. 1). The brake sensor 68 is used to determine whether the field is applied in the direction required to effect regenerative braking by comparing the armature voltage to the supply voltage. If the armature voltage is greater than the supply voltage then the back emf of the motor must be reversed by reversing the polarity of the field to effect regenerative braking. If an operator forces the vehicle into a brake condition (reverses the direction selector switch and depresses the accelerator) the control circuit enters a brake execution loop and overrides the direction switch, 24 or 26 depending on the actual direction or travel, to maintain the field 38 applied in the direction of rotation of the armature 36 so that the system is forced into a regenerative braking mode. As shown in FIG. 4, the regenerative brake mode commences with a brake detect decision 70 if a brake signal is detected, the throttle potentiometer is read to obtain a brake torque set point 72. Otherwise control is returned to a drive sequence 74. It is apparent that if braking is selected the brake torque will depend on the throttle position. In other words, more throttle yields more brake torque. The armature current set point is set to a value of "K" times the reading obtained from the throttle potentiometer at 76, where K is an adjustable parameter which controls brake response. As will be obvious to those skilled in the art, other relations between pedal position are possible to give different pedal responses, commonly called "pedal feel".

After the armature current set point is established, a PWM braking signal is applied to SR FETS 46 (See FIG. 1) in step 78. A regen armature current is then tested using armature current sensor 34 to determine whether it is greater than the armature current set point established in step 80. If it is less than the armature current set point the PWM to the SR FETS 46 is increased at 82. Otherwise, the PWM to the SR FETS is reduced at 84 and control returns to the decision at 80. At step 86, the braking PWM is tested to determine if it is at a maximum value of 100%. If not, control returns to the decision at step 80. If the braking PWM is at maximum then field current is increased at 88 and the field current is tested using field current sensor 32 to determine whether the field current is at field maximum in step 90. If field current has not reached field maximum, control is returned to step 78 and the braking PWM is applied to the SR FETs 46. If the field current is at maximum, the armature current is tested to determine whether it is less than a critical armature current value at 92. If the armature current has dropped below a critical value the control is returned to a drive sequence at 94 because the vehicle has stopped. Otherwise, a wait state is executed until the armature current falls below the critical value which indicates that the vehicles momentum has been arrested.

This simple regenerative brake sequence permits effective regenerative braking when an operator elects a reversed braking option. The switching sequences of the H-bridge and the half-bridge during regenerative brake sequence are the same as previously described for automatic regenerative braking, synchronous-rectification techniques being use to co-ordinate the switching of the motor FETs 44 with the SR FETS 46. As described above, regenerative braking occurs automatically. in the optimal motor/controller configurations previously described whenever an operator of a vehicle driven by a one of the motors moves the accelerator potentiometer 28 to a position indicating deceleration of the vehicle.

It is apparent that the motor/controller configurations described above has many advantages over prior art motor/controller configurations. Advantages not yet realized or described above may yet become apparent.

The preferred embodiments of the invention hereinbefore described are intended to be exemplary only, the scope of the invention being limited solely by the scope of the appended claims.

I claim:

1. An electronic controller for a direct current traction motor, comprising:
   an H-bridge circuit for controlling a field current of the motor, the H-bridge circuit including four legs arranged in opposite pairs of an upper leg and a lower leg in each pair, each leg comprising a plurality of parallel connected power field effect transistors arranged for connection in series with the field; and
   a field gate electrode of the power field effect transistors in each said plurality is connected to a discrete common control line for switching each said plurality of field effect transistors in an on/off cycle of conduction through each said plurality of field effect transistors.

2. The controller for a direct current traction motor as claimed in claim 1 wherein one of an upper leg and a lower leg of each of the opposite pairs of legs in the H-bridge of a controller for a series-wound motor includes more power field effect transistors than an other of the upper and the lower leg of each pair of legs of the H-bridge, whereby current multiplication in the field of the series-wound motor is used to conserve the number of field effect transistors required for switching a field current of the motor.

3. The controller for a direct current traction motor as claimed in claim 2 wherein the number of power field effect transistors in the one of an upper leg and a lower leg which includes more power field effect transistors is three to five times the number of power field effect transistors in an other of the upper and the lower leg of each pair.

4. The controller for a direct current traction motor as claimed in claim 1 wherein the controller further comprises:

a first plurality of parallel-connected power field effect transistors arranged for connection in series with an armature of the motor, a field gate electrode of each first field effect transistor being connected to a first common control line for controlling an on-off cycle of conduction through the first field effect transistors to provide drive current to the armature of the motor from a direct current source; and a second plurality of parallel-connected power field effect transistors arranged for connection in parallel with the armature of the motor, a field gate electrode of each second field effect transistor being connected to a second common control line for controlling a synchronous-rectification on-off cycle of conduction through the second field effect transistors for commuting an armature current when the first parallel-connected field effect transistors are switched off.

5. The controller for a direct current traction motor as claimed in claim 4 wherein braking is essentially a regenerative process, the second plurality of parallel-connected power field effect transistors arranged for connection in parallel with the armature of the motor acting as regenerative braking switches when the traction motor is in a condition of deceleration as indicated by a throttle position, whereby during periods that an operator is decelerating the motor, the field is energized in a direction in which the armature is rotating so that when the second plurality of parallel-connected power field effect transistors are closed the armature is momentarily shorted and current generates on the armature, and when the second plurality of parallel-connected power field effect transistors is opened, the current generated on the armature commutes back to the battery through the first plurality of field effect transistors which are closed in a synchronous-rectification cycle to regenerate a battery charge.

6. The controller for a direct current traction motor as claimed in claim 5 wherein when the second plurality of parallel-connected power field effect transistors are driven at a maximum duty cycle the field current is increased incrementally until one of a maximum field current is achieved or armature current drops below a defined critical limit indicating that a momentum of a vehicle being braked has been arrested, thereby providing a strong braking response even at low motor rotational speeds.

7. The controller for a direct current traction motor as claimed in claim 5 wherein a microprocessor component of the controller accepts and stores a variable which is used to determine a minimum field strength for the motor during periods of motor deceleration, thereby providing a user selectable regenerative braking response.

8. The controller for a direct current traction motor as claimed in claim 7 wherein the controller is connected with a series-wound motor and during periods that the motor is decelerating the field current of the motor is maintained at the armature current until the field current drops to the minimum field strength which is defined by the variable that provides the user selectable regenerative braking response.

9. The controller for a direct current tractor motor as claimed in claim 1 wherein each leg comprises electrical switching components consisting exclusively of parallel connected power field effect transistors.

10. An electronic controller for a direct current traction motor, comprising:

an H-bridge circuit for controlling a field current of the motor, the H-bridge circuit including four legs arranged in opposite pairs of an upper leg and a lower leg in each pair, each leg including a plurality of parallel connected power field effect transistors arranged for connection in series with a field of the motor;

a field gate electrode of the power field effect transistors in each said plurality being connected to a discrete common control line for switching each said plurality of field effect transistors in an on/off cycle of conduction through each said plurality of field effect transistors; and the discrete control lines are driven so that when the plurality of power field effect transistors of one of a first pair of the legs is switched on, the plurality of field effect transistors in an other of the first pair of legs is switched off, and, in the opposite pair of legs, the power field effect transistors in a leg diagonally opposite the one of the first pair are switched in a pulse width modulated on/off cycle of conduction to energize the field while the plurality of power field effect transistors in an other leg of the opposite pair of legs is switched in a synchronous-rectification on/off cycle of conduction to commute the field current.

11. The electronic controller for a direct current traction motor as claimed in claim 9 further comprising a half-bridge for controlling an armature current of the motor, the half-bridge including:

a first plurality of parallel-connected power field effect transistors arranged for connection in series with an armature of the motor, a field gate electrode of each first field effect transistor being connected to a first common control line for controlling an on-off cycle of conduction through the first field effect transistors to provide drive current to the armature of the motor from a direct current source; and a second plurality of parallel-connected power field effect transistors arranged for connection in parallel with the armature of the motor, a field gate electrode of each second field effect transistor being connected to a second common control line for controlling a synchronous-rectification on-off cycle of conduction through the second field effect transistors for commuting an armature current when the first parallel-connected field effect transistors are switched off.

12. A motor/controller configuration for a direct current traction motor wherein the motor is a separately excited motor, the combination comprising:

an H-bridge circuit for controlling a field current of the motor, the H-bridge circuit including four legs arranged in opposite pairs of an upper leg and a lower leg in each pair, each leg comprising a plurality of parallel connected power field effect transistors arranged for connection in series with the field;

a field gate electrode of the power field effect transistors in each said plurality being connected to a discrete common control line for switching each said plurality of field effect transistors in an on/off cycle of conduction through the field effect transistors; and the separately excited motor having a field which is wound so that a rated field current is obtained at a field voltage equal to a peak voltage output of a direct current power source for the motor divided by a ratio of a peak operating current to a rated operating current of the motor.

13. An electronic controller for a direct current series-wound traction motor, comprising:
- a half-bridge circuit for controlling an armature current of the motor, the half-bridge circuit including a first plurality of parallel connected power field effect transistors connected in series with the armature of the motor and a second plurality of parallel connected power field effect transistors connected in parallel with the armature of the motor;
- an H-bridge circuit for controlling a field current of the motor, the H-bridge circuit including four legs arranged in opposite pairs of an upper leg and a lower leg in each pair, each leg comprising a plurality of parallel connected field effect transistors arranged for connection in series with the field, a field gate electrode of the power field effect transistors in each said leg being connected to a discrete common control line for switching the field effect transistors in each said leg in an on/off cycle of conduction; and
- a logic circuit connected with each discrete common control line, the logic circuit controlling the switching of each plurality of power field effect transistors in the half-bridge circuit and the H-bridge circuit in accordance with a predefined algorithm.

14. An electronic controller for a direct current series-wound traction motor as claimed in claim 13 wherein the controller further comprises a sensor for sensing the current on the armature and a sensor for sensing the current on the field of the motor.

15. An electronic controller for a direct current separately excited traction motor, comprising:
- a half-bridge circuit for controlling an armature current of the motor, the half-bridge circuit including a first plurality of parallel connected power field effect transistors connected in series with the armature of the motor and a second plurality of parallel connected power field effect transistors connected in parallel with the armature of the motor;
- an H-bridge circuit for controlling a field current of the motor, the H-bridge circuit including four legs arranged in opposite pairs of an upper leg and a lower leg in each pair, each leg comprising a plurality of parallel connected field effect transistors arranged for connection in series with the field, a field gate electrode of the power field effect transistors in each said leg being connected to a discrete common control line for switching the plurality of field effect transistors in each said leg in an on/off cycle of conduction; and
- a logic circuit connected with each discrete common control line, the logic circuit controlling the switching of each plurality of power field effect transistors in the half-bridge and the H-bridge in accordance with a predefined algorithm.

16. An electronic controller for a direct current separately excited traction motor as claimed in claim 15 wherein the controller further includes a sensor for sensing a current on the armature and a sensor for sensing a current on the field of the motor.

17. A direct current separately excited traction motor and an electronic controller for the separately excited traction motor comprising, in combination:
- a separately excited traction motor having an armature and a field winding, the field winding being so constructed that a rated field current is obtained at a field voltage equal to a peak voltage output of a direct current power source for the motor divided by a ratio of a peak operating current to a rated operating current of the motor;
- a half-bridge circuit for controlling an armature current of the motor, the half-bridge circuit including a first plurality of parallel connected power field effect transistors connected in series with the armature of the motor and a second plurality of parallel connected power field effect transistors connected in parallel with the armature of the motor;
- an H-bridge circuit for controlling a field current of the motor, the H-bridge circuit including four legs arranged in opposite pairs of an upper leg and a lower leg in each pair, each leg comprising a plurality of parallel connected field effect transistors arranged for connection in series with the field, a field gate electrode of the power field effect transistors in each said plurality of field effect transistors being connected to a discrete common control line for switching each said plurality of field effect transistors in an on/off cycle of conduction; and
- a logic circuit connected with each discrete common control line, the logic circuit controlling the switching of each plurality of power field effect transistors in the half-bridge and the H-bridge in accordance with a predefined algorithm.

18. A method for braking the momentum of a vehicle driven by a direct current traction motor, comprising the steps of:
- detecting a brake condition by monitoring the condition of an accelerator potentiometer and/or a direction of travel indicator for controlling the speed and direction of the motor, respectively;
- on detecting a brake condition, reading a throttle potentiometer to obtain a brake torque set point;
- computing an armature current set point by multiplying the throttle position value by a user defined brake response constant;
- applying a pulse width modulated signal to control a current flow to the armature;
- testing the armature current to ascertain if the armature current has exceeded the armature current set point;
- adjusting the pulse width modulated signal to adjust the armature current upward until the armature current exceeds the set point or the pulse with modulated signal attains a maximum value;
- when the pulse with modulated signal reaches a maximum value, increasing a field current of the motor until the field current reaches a predetermined maximum value; and
- executing a wait state until the armature current drops below a predefined critical limit indicating that the momentum has been arrested.

* * * * *